United States Patent [19]

Ohtomo et al.

[11] Patent Number: 4,484,816
[45] Date of Patent: * Nov. 27, 1984

[54] APPARATUS FOR MEASURING LENGTH OR ANGLE

[75] Inventors: Fumio Ohtomo, Kawagoe; Kazuaki Kimura, Tokyo, both of Japan

[73] Assignee: Tokyo Kogaku Kikai K.K., Tokyo, Japan

[*] Notice: The portion of the term of this patent subsequent to Nov. 1, 2000 has been disclaimed.

[21] Appl. No.: 515,454

[22] Filed: Jul. 20, 1983

Related U.S. Application Data

[63] Continuation of Ser. No. 260,789, May 5, 1981, Pat. No. 4,412,745.

[30] Foreign Application Priority Data

May 12, 1980 [JP] Japan .................................. 55-62407

[51] Int. Cl.$^3$ .......................... G01B 1/00; G01B 11/14
[52] U.S. Cl. ................................ 356/372; 250/237 G; 250/560
[58] Field of Search ............................. 356/373-375, 356/372, 376-380, 383-385; 250/231 R, 231 SE, 578, 560-561, 237 G

[56] References Cited

U.S. PATENT DOCUMENTS

| | | | |
|---|---|---|---|
| 3,060,791 | 10/1962 | Tarczy-Hornoch | 356/372 |
| 3,973,119 | 8/1976 | Renes et al. | 250/231 R |
| 4,100,420 | 7/1978 | Metcalf et al. | 250/561 |
| 4,160,599 | 7/1979 | Sperrazza | 250/560 |
| 4,301,471 | 11/1981 | Holscher et al. | 250/578 |
| 4,306,812 | 12/1981 | Lapp et al. | 356/385 |
| 4,340,819 | 7/1982 | Ogasawara et al. | 250/578 |

*Primary Examiner*—William H. Punter
*Attorney, Agent, or Firm*—Oblon, Fisher, Spivak, McClelland & Maier

[57] ABSTRACT

A light image of a scale, which bears length or angle information recorded in the form of a bright and dark bit pattern, is projected onto the light receiving surface of a storage effect type sensor, whereby a charge pattern data corresponding to the projected image is formed. Before the regular read-out of the charge pattern data thus formed from the sensor, the sensor is scanned at least once at a higher scanning frequency than the frequency for the regular data read-out. From the data thus read out, read-out data that obtained in the absence of illumination light is subtracted, and the resultant data which is free from error component is processed to obtain a final measurement of the length or angle.

18 Claims, 18 Drawing Figures

F I G. 1
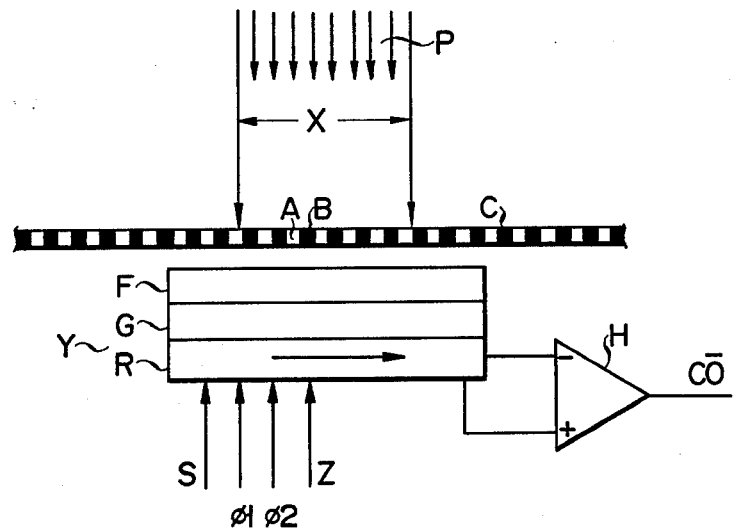
F I G. 2
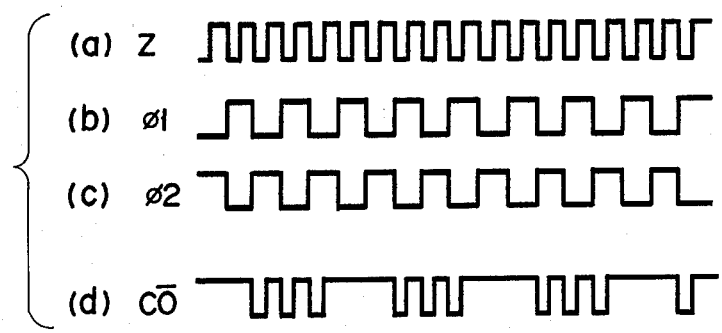

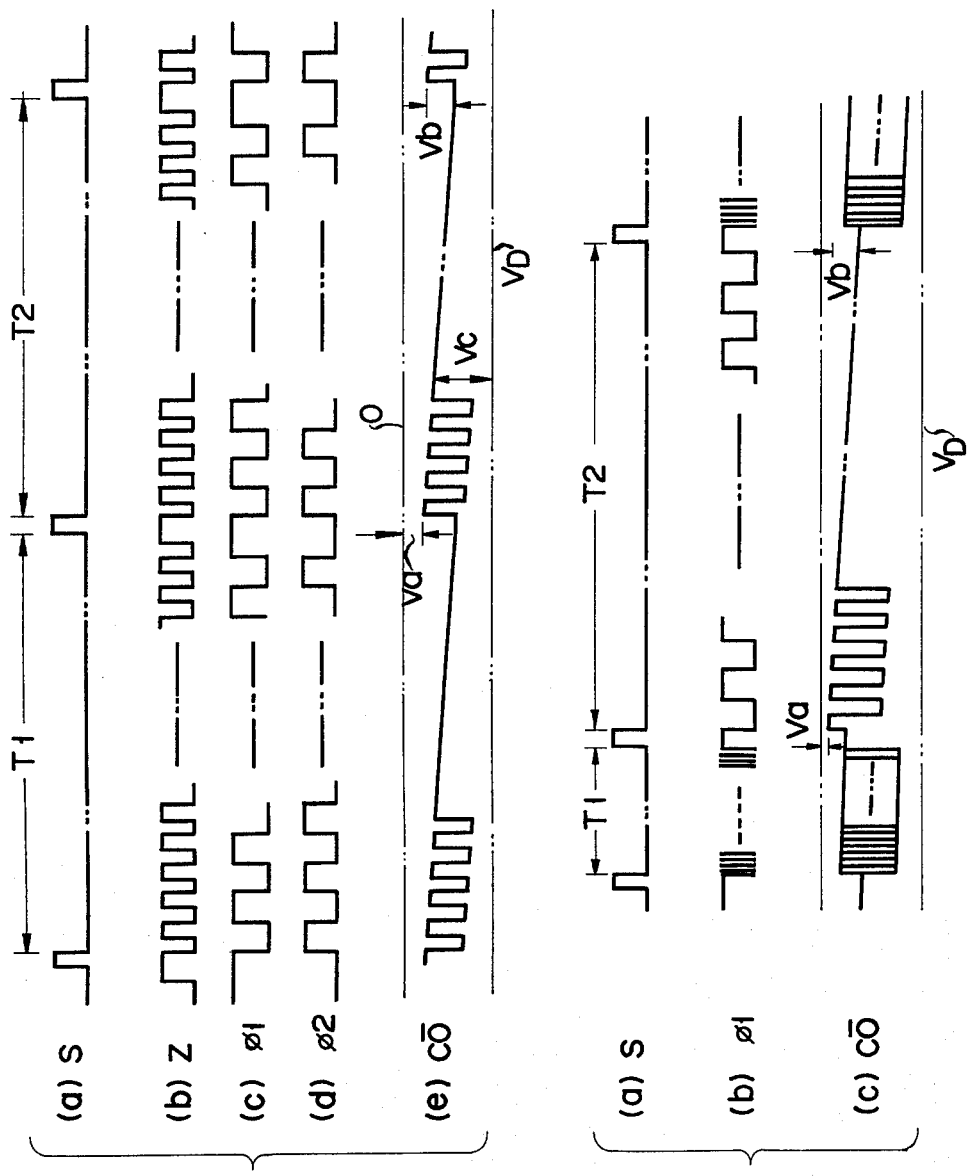

F I G. 10
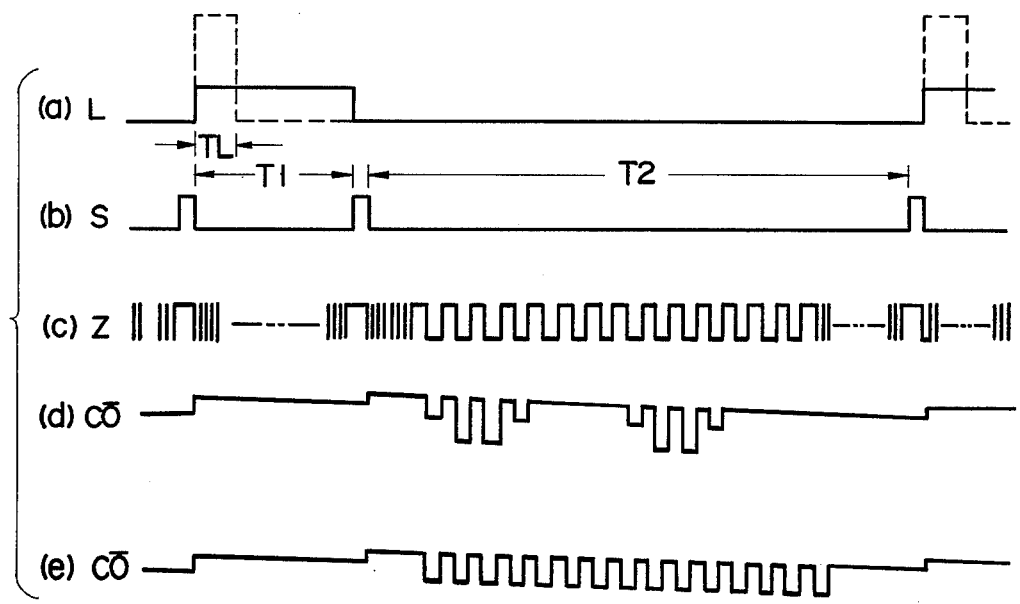
F I G. 13
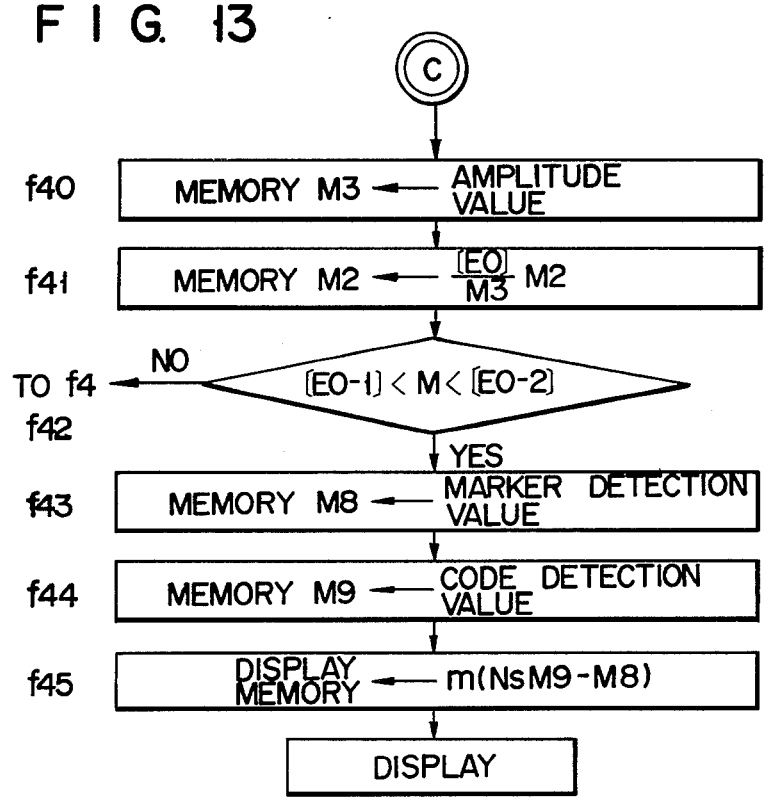

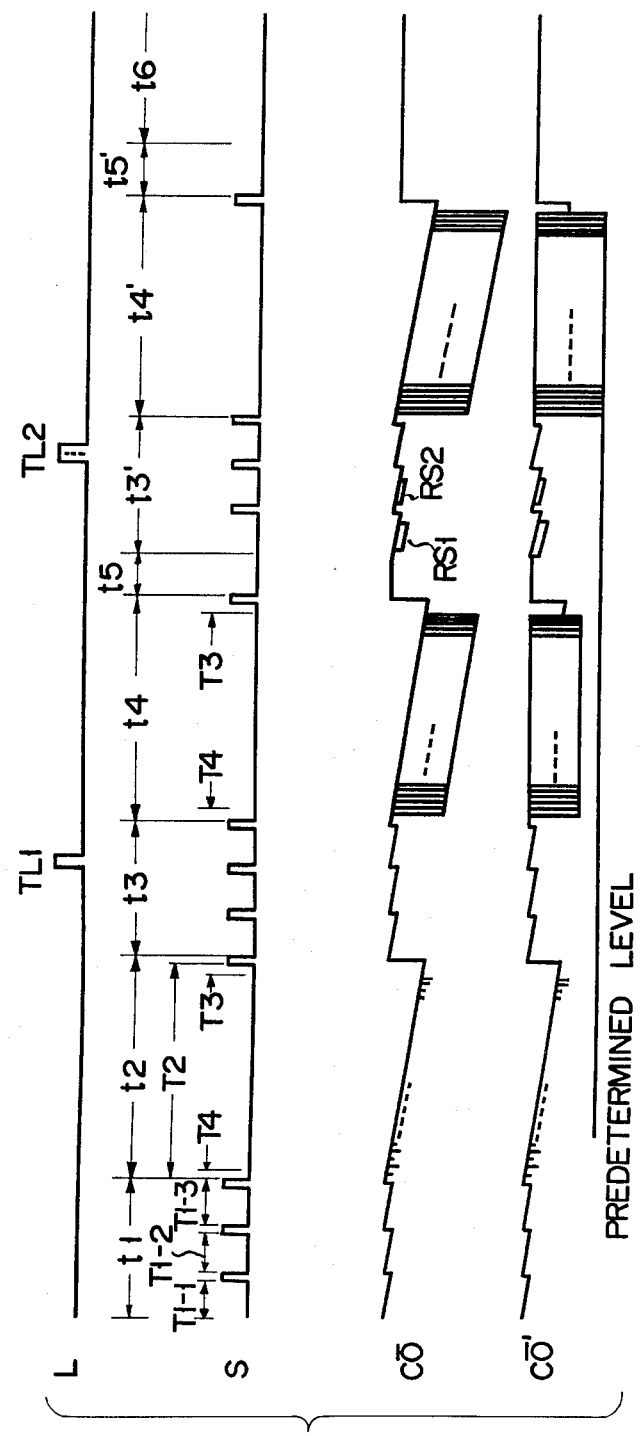

APPARATUS FOR MEASURING LENGTH OR ANGLE

This is a continuation of application Ser. No. 260,789, filed May 5, 1981, now U.S. Pat. No. 4,412,745.

BACKGROUND OF THE INVENTION

This invention relates to apparatus for measuring length or angle, which include a data reading apparatus using a storage effect type sensor such as a charge coupled device (abbreviated CCD).

The measurement of the translational displacement or angle of rotation of an object from a reference point under remote control may be generally made by providing a scale on the object, effecting zero resetting at a position constituting the reference point of the scale, optically or electromagnetically counting the translational displacement or rotational angle and displaying the result, for instance on a display unit.

However, in this method, which is based upon a commonly termed incremental system for measuring the relative movement of the scale and sensor from an electric signal generated at the time of the movement, it is necessary to detect the reference point.

To overcome this inconvenience, an absolute system where the scale is encoded has been proposed. This system uses a scale, which is graduated with codes of lengths from a reference point, so that a given length from the reference point can be obtained by reading the scale without need of detecting the reference point.

The feature of this absolute system that it is not necessary to detect the reference point leads to a feature that the system permits intermittent or sampling measurements. With the incremental system, which depends for measurement upon the count after the zero resetting, the sampling measurements are difficult to make because of the fact that the reading system and processing system that constitute the incremental system has to be always operating.

With regard to the construction of the absolute system, however, compared to the incremental system, which comprises a reading system dealing with a signal from a few number of sensors (a single sensor in the extreme case) and a processing system mainly constituted by a counter section, the absolute system has to use a great number of sensors for the reading of the scale, and also the shape of the sensor is restricted since the size of the sensor corresponds to the quantity of signal. Therefore, in order to be able to obtain a sufficient resolution, it is necessary to permit fine measurement with some or other means, and this dictates many disadvantageous requirements to the reading system and processing system of the absolute system.

As a solution to these problems in the absolute system, it is thought to use a storage effect type sensor. The storage effect type sensor has a number of sensor elements and outputs the stored signal as a serial signal, so that the reading system and processing system can be simplified.

Now, the absolute system using a storage effect type sensor will be described.

The storage effect type sensor has a construction of, for example, a charge coupled device (CCD) having a photoelement section, a gate section and a shift register section. The photoelement section has a number of light receiving elements arranged in a row and each having a function of storing charge introduced in correspondence to the intensity of the incident light. The shift register section has bits corresponding in number to the number of light receiving elements in the photoelement section. The charges stored in the individual light receiving elements are simultaneously transferred through the gate section to the respective bits, and when a scanning pulse signal is given the charges transferred to the individual bits are sequentially provided as a time series output signal. In the storage effect type sensor having the above construction, the width of each light receiving element constituting the photoelement section may usually be set to the order of ten and several microns, so that it is possible to obtain the reading of the scale and also subdivide or interpolate each graduation.

As shown in FIG. 1, a storage effect type sensor, for instance a CCD Y, having a photoelement section F, gate section G and a shift register section R, is provided to face one side of a scale C, in which bright (or transparent) sections A and dark (or non-transparent) sections B are alternately arranged along a straight line. When a parallel light beam P having a width X is projected onto the other side of the scale C, charges are stored in the light receiving elements in the photoelement section F corresponding to bright sections A of the scale in accordance with the incident light intensity. At this time, by supplying a gate pulse S and also a reset pulse signal Z and scanning pulses $\phi_1$ and $\phi_2$ having one-half the frequency of the pulse signal Z and 180° out of phase from each other, as shown in FIG. 2, to the CCD Y, an output $\overline{CO}$ as shown in (d) in FIG. 2 is obtained from a differential amplifier H. In this example, the width of the bright sections A is set to correspond to three light receiving elements in the photoelement section F and three light receiving sections accurately face to each bright section A, so that the differential amplifier H provides a time series pulse signal including the corresponding three consecutive pulses at a time in accordance with the aforementioned correspondence relation. Thus, by appropriately combining a scale in which the length from a reference point is encoded in terms of a bright and dark bit pattern and a storage effect type sensor, it is possible to obtain measurement of the distance, i.e., length, from the reference point of the scale with a precision factor of ten and several microns or less. FIG. 3 shows a specific example of the combination of the two. Here, the length of the scale C is divided into a plurality of blocks of the same length. In the Figure, block $N_p$ and $N_{p-1}$ are shown. Taking the block $N_p$, for instance, a marker M is formed at the left end of this block in the form of a bright section having a width corresponding to four light receiving elements in the photoelement section F of the CCD Y, each light receiving element being given a unit width. The block $N_{p-1}$ adjacent to the block $N_p$ has a block stop marker D formed at its right end in the form of a dark section having a width corresponding to four light receiving elements of the CCD Y. Of the marker M, which corresponds in width to four elements, a portion adjacent to the block stop marker D and having a width corresponding to one element is made as a marker bit $I_m$. On the right side of the marker M, dark sections $K_1, K_2, K_3, \ldots$ having a width corresponding to two elements and spaced apart from one another by an interval corresponding to two elements are formed. Further, address sections $P_1, P_2, P_3, \ldots$ each corresponding in width to two elements are provided between adjacent dark sections, and binary codes $2^0, 2^1$, $2^2, \ldots$ are allotted to the respective address sections $P_1$, $P_2$, $P_3$, ... In the illustrated example, the address sections $P_1$ and $P_3$ are formed as bright sections, while the other address sections are formed as dark sections. In the block $N_{p-1}$, similar address sections are also formed, but in this block the values of the binary coded address sections allotted are those in the block $N_p$ minus 1.

Using the scale C and CCD Y having the arrangement as described above, the distance from the reference point of the scale C can be measured in the following way.

The individual light receiving elements constituting the photoelement section F of the CCD Y are given respective bit numbers as shown, and a particular bit is made as an index bit $I_n$. The scale C is then irradiated with a parallel light beam with a width X greater than that of two blocks, and the state of the CCD Y is examined. In the first place, the position of the photoelement section corresponding to the marker M and block stop marker D, individually corresponding in width to four elements, is determined, and then the position corresponding to the marker bit $I_m$ is determined. In the illustrated case, the bit labeled ⓪ in the photoelement section of the CCD Y corresponds to the marker bit $I_m$. Since the positional relation of the marker bit $I_m$ to the address sections $P_1$, $P_2$, $P_3$, ... is clear, the position of a given address section of the photoelement section of the CCD Y can be known from this positional relation and the bit ⓪ corresponding to the marker bit $I_m$. At this time, whether the bits labeled ⑥ and ⑦, ⑩ and ⑪, ⑭ and ⑮, etc. are "on", i.e., receiving light, is detected. In the instant case, the bits ⑥ and 7 are "on", that is, the $2^0$ place order bit is "on". Also, the bits ⑩ and ⑪, i.e., the $2^1$ place order bit, is "off". Likewise, the bits − and ⑮, i.e., the $2^2$ place order bit, is "on", and the bits ⑱ and ⑲, i.e., the $2^3$ place order bit, is "off". Consequently, the absolute address of the block $N_p$ is $2^2+2^0=5$, indicating that the block $N_p$ is a fifth one from the reference point of the scale. If one block consists of 26 bits as shown in the Figure and the width of one bit is 15 μm, the width of one block is 15 μm×26=0.39 mm. Accordingly, it can be known that the block $N_p$ is moved by 0.39 mm×5=1.95 mm from the reference point. Subsequently, for obtaining the accurate distance, the bits from the index bit $I_n$ to the bit ⓪ corresponding to the marker bit $I_m$ are counted. In the instant example there are 5 bits, and hence the accurate distance is 1.95 mm−15 μm×5=1.875 mm.

In general, denoting the number of bits from the index bit $I_n$ to the marker bit $I_m$ by $N_c$, the address of the block by ACD, the number of elements in the photoelement section F corresponding to one block length by $N_s$ and the width of one element by m μm, the measurement value E is $$E = m(N_s \cdot ACD - N_c) \ (\mu m). \ M.$$

While this equation applies in case of the measurement of the address of the block, whose marker is on the right side of the index bit $I_n$ in FIG. 3, in the case of the measurement of the address of a block whose marker is on the left side of the index bit $I_n$, the measurement is given as $$E = m(N_s \cdot ACD + N_c).$$

Further, when increasing the precision of measurement within the width of one bit of the element of the photoelement section, a vernier scale section may be provided between the marker section and address sections of each block such that the number of photoelement section elements in the same length as the vernier scale section is $N_B+1$ where $N_B$ is the number of bits of the vernier section, and the state of overlap between the scale side vernier scale section bits and the photoelement section bits may be examined (to determine the position of the bits in right overlap, for instance).

By combining the scale which has an absolute address based upon a bright and dark bit pattern and a storage effect type sensor, it is possible to measure the distance, i.e., length, with high precision without need of detecting the reference point, and this method can also be directly applied to the measurement of angle.

However, if it is intended to make actual measurement of the length or angle by using the storage effect type sensor in the manner as described, the measurement contains a large error due to the following problems.

Taking now the case of measurement by storing charge in the photoelement section F in the CCD Y shown in FIG. 1 in the period $T_1$ shown in FIG. 4, transferring the charge at the instant of end of the period $T_1$ to the shift register R by the bit parallel method with the supply of the gate pulse S as shown in (a) in FIG. 4 and reading out the content of the shift register R in a period $T_2$, the output $\overline{CO}$ of the operational amplifier H is usually as shown in (e) in FIG. 4, having a certain slope with respect to a reference level. As is shown, at the start of the reading from the shift register R the reference level is already drifted by $V_a$ from an ideal level, for instance 0 level, and at the end of the reading it is further drifted by $V_b$ from $V_a$. Such variations of the reference level result from the dark current in the photoelement section F and shift register section R. $V_a$ is a voltage corresponding to the charge stored by the dark current in the photoelement section F, while $V_b$ is a voltage corresponding to the charge stored with the dark current in the shift register section R. The value of $V_a$ is proportional to the period $T_1$, while the value of $V_b$ is proportional to the period $T_2$. With such variations of the reference level, the signal $V_c$ read out also varies with respect to the aforementioned level, so that an erroneous operation of the system for processing the read-out signal is prone. Also, the values of $V_a$ and $V_b$ vary with temperature, and in an extreme case the reference level reaches the saturation level $V_D$ due to the dark current component, and in such a case the read-out of signal can no longer be obtained. Particularly, when it is intended to make signal processing as mentioned above with the combination of the scale C having bright and dark portions and CCD Y as shown in FIG. 3, with the aforementioned variation of the output signal level accurate measurement cannot be expected because the reading of the address and detection of the number of bits from the index bit to the marker bit have to be effected on the basis of the level of the output signal for each bit.

From the above ground, in the usual method using CCD, the frequency of the scanning pulse signals $\phi_1$ and $\phi_2$ supplied to the CCD Y is set to a sufficiently high value, for instance above 100 kHz, to reduce the values of $V_a$ and $V_b$. However, where the CCD is used in a system processing output of the CCD, the output $\overline{CO}$ is required to be processed at least within 5 μsec. To this end, an expensive high-speed A/D converter is required, and also it is necessary to use an expensive high-speed microcomputer for the processing of the output of the aforementioned high-speed A/D converter and control of the CCD. Further, since $V_a$ and $V_b$ are influenced by temperature even if the frequency of the scanning pulse signals is increased by adopting the aforementioned method, means for correcting $V_a$ and $V_b$ are required in order to ensure reliable signal processing operation and improve the measurement precision.

In a further aspect, where the storage effect type sensor, typically CCD, is used, although the measurement can be conveniently obtained when the scale C is stationary, when the scale C is moving, the position of the photoelement section illuminated by light through the bright portions of the scale C is instantaneously changed, that is, information of the state of light reception is recorded for each instant. Therefore, the maximum speed of the scale C at which the measurement can be made is limited to a comparatively low speed. If the maximum allowable speed is increased by some or other means, the condition for using is greatly restricted.

Insofar as the aforementioned various means are necessary for using the storage effect type sensor, the simplification of the data reading and processing systems sought as a preamble of the invention in using a storage effect type sensor, can not be achieved.

SUMMARY OF THE INVENTION

The invention is intended in the light of the above affairs, and its object is to provide a length or angle measurement apparatus, which uses a storage effect type sensor and permits measurement over a wide temperature range without need of providing high speed operation character to its component means.

Another object of the invention is to provide a low-cost length or angle measurement apparatus based upon the absolute system, which comprises simple construction and with which satisfactory measurement can be obtained in a state of high speed motion as well as in the stationary state of the scale.

BRIEF DESCRIPTION OF THE DRAWINGS

FIG. 1 is a view showing an example of the arrangement of a storage effect type sensor and a scale having a bright and dark bit pattern used in combination;

FIG. 2 is a waveform chart showing signals involved when the storage effect type sensor in FIG. 1 is scanned;

FIG. 4 is a waveform diagram for illustrating the problem posed when the measurement of length is made by using the scale and sensor shown in FIG. 3;

FIGS. 5 to 10 are waveform diagrams illustrating the principles of the invention;

FIGS. 12A to 12E and 13 are flow charts illustrating the operation of the apparatus shown in FIG. 11; and FIG. 14 is a waveform diagram illustrating the overall operation of the apparatus shown in FIG. 11.

DETAILED DESCRIPTION OF THE PREFERRED EMBODIMENT

Figure 3:
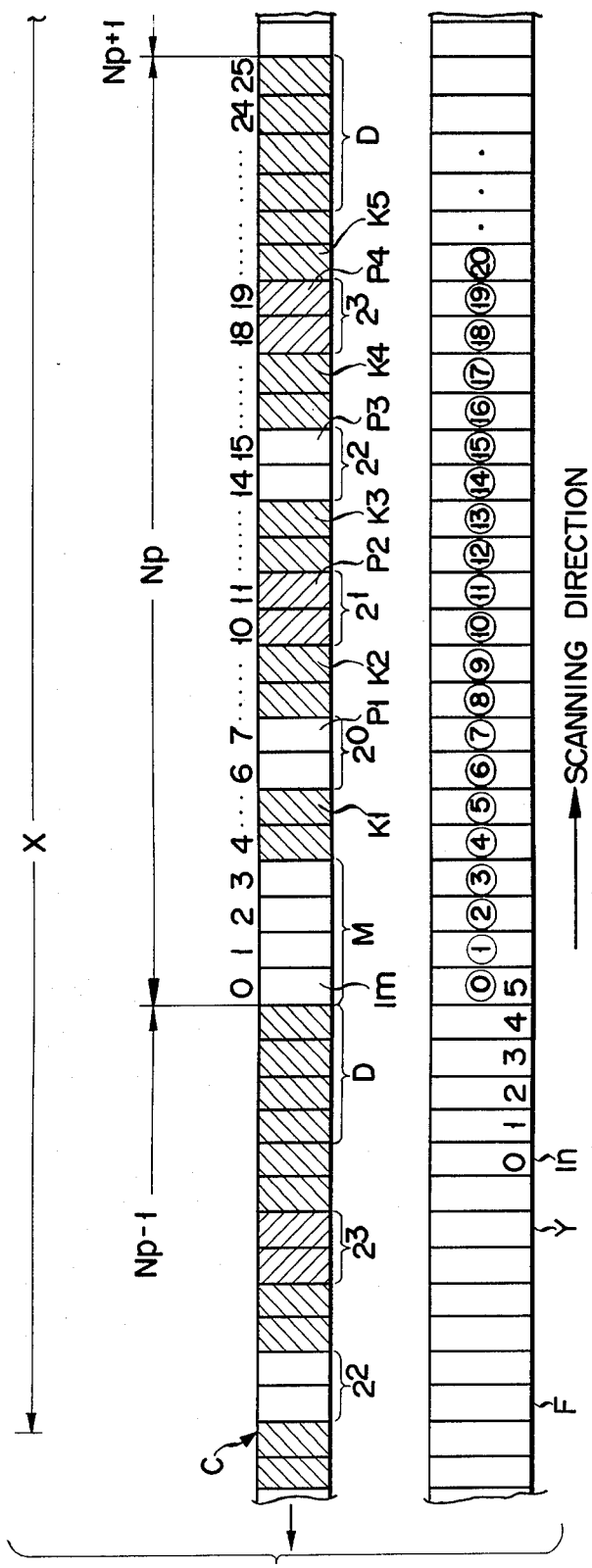
FIG. 3 is a view showing an example of the relation between a storage effect type sensor and a scale having a bright and dark bit pattern when both are used in combination for the measurement.

According to the invention, the aforementioned objective is achieved by providing three means characterizing the invention and integrating the processing control sections of the individual means.

More particularly, the features of the invention are:

(1) storage effect type sensor drive means, which makes it unnecessary for the components of the apparatus to have a high speed character;

(2) dark current storage compensation means, which permits the use of the apparatus over a wide temperature range;

(3) means for emitting pulse light and for stabilizing a signal, which makes possible the measurement in a state of high speed motion and also ensures stable operation for a long time with the stabilization of signal; and (4) integration of the processing control sections of the individual means mentioned above for simplifying the apparatus, and processing method to obtain value of the measurements.

Now, the principles and system underlying the invention and the effects obtainable therewith will be discussed with reference to FIGS. 4 through 10 and 14 before giving a specific embodiment.

(1) Storage effect type sensor drive means

As has been mentioned previously, the output $\overline{CO}$ obtained as a result of reading out charge from a storage effect type sensor, typically a CCD, always contains drift components $V_a$ and $V_b$ which are undesired from the standpoint of the signal processing. These drift components $V_a$ and $V_b$ are proportional to the light reception period and scanning period. The invention is based upon this fact, and according to the invention prior to reading out data from the shift register section R a so-called "full emptying scanning" of all the bits of the register R with a high frequency scanning pulse signal is made to remove and discard the data stored in the shift register R, then data in the photoelement section F is transferred to the shift register section R and then read out with a scanning pulse at a sufficiently low frequency to be able to be followed by the signal processing system. More particularly, as shown in FIG. 5, during a period $T_1$ immediately before a period $T_2$ during which the signals read out from the shift register section R are actually introduced into the processing system, all the bits of the shift register section R are "full emptying scanned" with a scanning pulse signal at a high frequency, for instance ten times as high as the scanning pulse signal frequency for the period $T_2$, and the output data at this time is discarded. Since the "full emptying scanning" is made with the scanning pulse signal at ten times the frequency in the period $T_2$, the period $T_1$ may be 1/10 of the period $T_2$. Thus, the period of the light reception in the photoelement section F is set to 1/10 of the period $T_2$. In this case, $V_a$ can be reduced to 1/10 compared to the case where $T_1$ is set equal to $T_2$ as in the prior art by increasing the light intensity to ten times that of the instant case. In other words, the effect of $V_a$ can be greatly alleviated. The period $T_1$ for scanning at least all the bits of the shift register section R is referred to as the period of "full emptying scanning".

Figure 6:
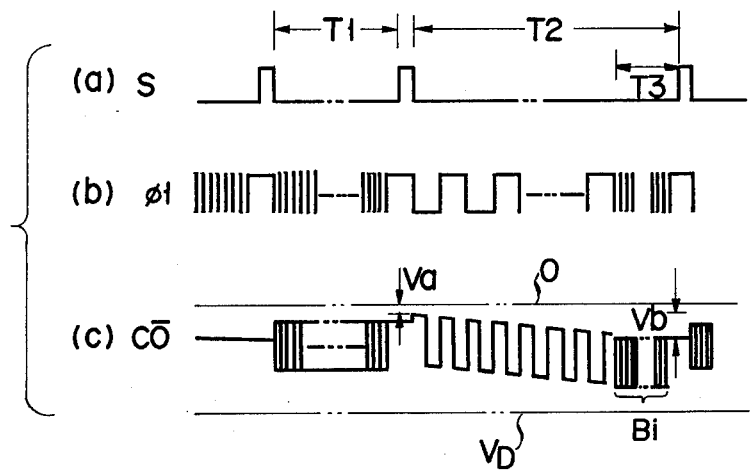
Figure 7:
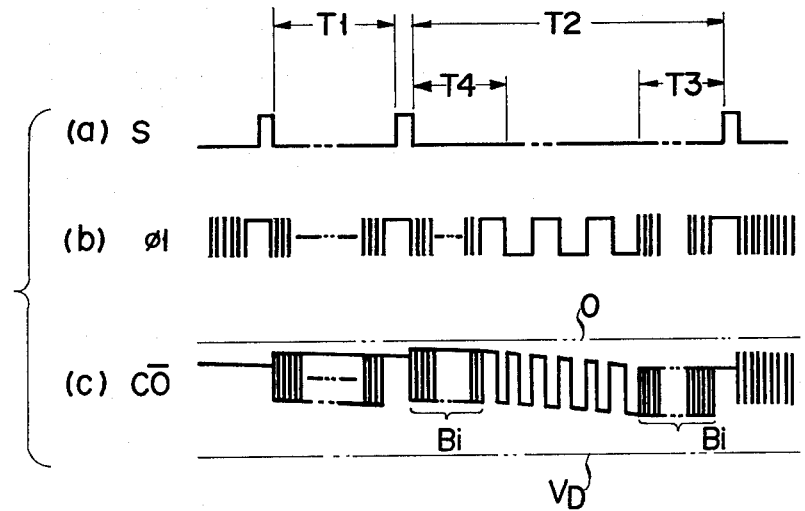
Figure 8:
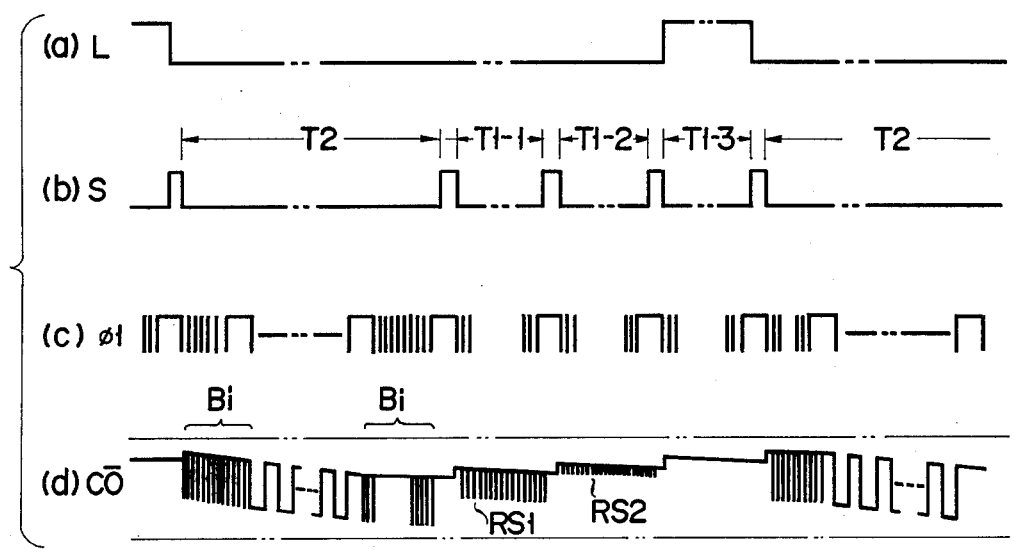
Figure 9:
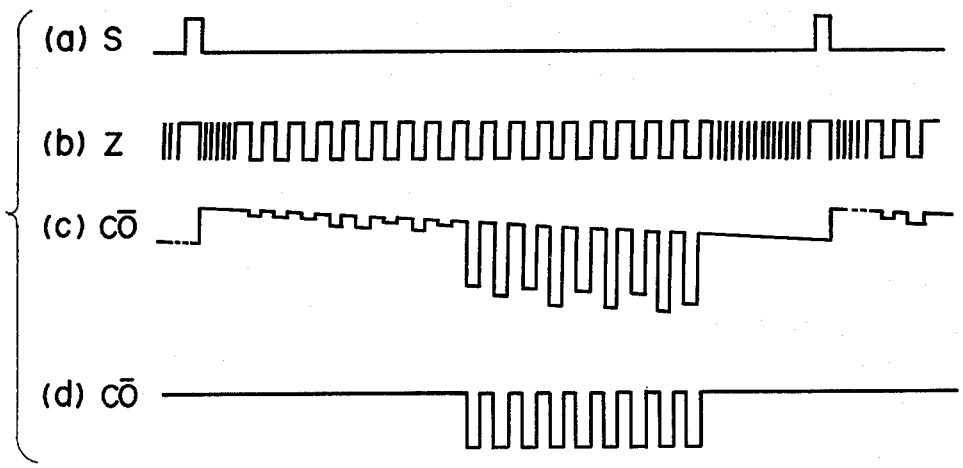

The "emptying scanning" mentioned above may be made not only in a single "full emptying scanning" period before the reading of data, but it may be adopted when scanning redundant bits $B_i$ in a portion not directly contributing to the measurement in the data read-out period $T_2$, as shown in FIGS. 6 and 7, whereby the period required for scanning the aforementioned portion can be reduced to aid in alleviating the effect of the dark current storage in the shift register section R, i.e., alleviate the effect of $V_b$. In this case, the output $\overline{CO}$ corresponding to the bits $B_i$ is discarded. Thus, the scanning of this portion can be referred to as "partial emptying scanning". Further, it is possible to eliminate the effect of the residual image by providing N "full emptying scanning" periods, for instance three "full emptying scanning" periods $T_{1\text{-}1}$, $T_{1\text{-}2}$ and $T_{1\text{-}3}$ as shown in FIG. 8. (In FIG. 8, the progressive reduction of the effect is seen from $RS_1$ and $RS_2$). Shown in (a) in FIG. 8 is the illumination light L. In the CCD, the output $\overline{CO}$ obtained by the first scanning from the turning on of the power supply is at the saturation level independently of the incidence of light. To obtain the normal state from such a state, it is necessary to make scanning several times. In this respect, the N "full emptying scanning" periods provided before the data read-out period $T_2$ as mentioned above can also serve as the period for recovering the normal state.

It is to be understood that one feature of the apparatus according to the invention is to effect, prior to the reading of data from the shift register section R, a "full emptying scanning" of the shift register section R with a scanning pulse signal at a frequency higher than the data read-out scanning pulse signal frequency and also effect, if necessary, a "partial emptying scanning" even during the data read-out period to reduce the drift voltages $V_a$ and $V_b$ due to the storage of the dark current in the photoelement section F and shift register section R so as to alleviate the effect of the dark current storage.

(2) Dark current storage compensation means

As mentioned previously, the reference level of the output $\overline{CO}$ of the storage effect type sensor, typically CCD, is subject to drift due to the storage of the dark current. Also, the outputs for the individual bits are not constant with respect to the dark current. More particularly, where light is received by the CCD sensor through a scale having a pattern with the left half being a bright portion and the right half being a dark portion, the output $\overline{CO}$ of the sensor is as shown in (c) in FIG. 9. As is shown, the output $\overline{CO}$ of the CCD fluctuates for each bit with respect to the dark current. The fluctuation for each bit and also the drift greatly vary with the ambient temperature and is usually increased with increasing temperature. While the extent of fluctuation also depends upon the scanning frequency of the CCD, a measure based upon the increase of the scanning frequency is not a completely satisfactory measure. Particularly, where measurement within the width of one bit portion is made for improving the precision by providing a vernier on the scale, the fluctuation for each bit and also the drift greatly affect the measurement precision for the measurement depends upon the measurement of signal for one bit. Therefore, in case when it is intended to provide for steady and stable data processing operation or increase the precision of measurement, it is necessary to remove the aforementioned fluctuation and drift component changing with the ambient temperature.

With the apparatus according to the invention, the light source is controlled such as to obtain output data from the CCD when the scale is illuminated by light (i.e., data in the presence of light) and also output data of CCD when the scale is not illuminated (i.e., data in the absence of light), and the "data in the absence of light" is subtracted from the "data in the presence of light" to thereby remove the aforementioned fluctuation and drift component. The resultant data is neat and free from the fluctuation component, as shown in (d) in FIG. 9. It may be thought to effect the process of subtracting the "data in the absence of light" from the "data in the presence of light" by using microcomputer. This, however, is undesired because a long time is required for the calculation when the quantity of data dealt with is large. Therefore, according to the invention the calculation is effected with hardward in order to reduce time required for it.

(3) Means for emitting a pulse light and for stabilizing a signal

A case in which the scale is illuminated by illumination light L for only a period $T_1$ and the data thus obtained is read out during a period $T_2$ as shown in FIG. 10, will now be considered. Assuming that the bright and dark portions of the scale C shown in FIG. 1 correspond in width to three bits of the photoelement section F and that the scale C is moved by an amount corresponding to one bit during the period $T_1$, the output $\overline{CO}$ of the CCD at this time is as shown in (d) in FIG. 10, which is a time-series or sequential signal. This is due to the fact that the photoelement section F stores the signal produced as a result of the illumination. In case if the scale C is moved by an amount corresponding to three bits during the period $T_1$, the output $\overline{CO}$ is as shown in (e) in FIG. 10, and in this case the measurement can no longer be obtained. The maximum permissible speed of movement of the scale for obtaining the distinction between the bright and dark portions from the output $\overline{CO}$ is determined by the width of the bright and dark portions of the scale C and the period $T_1$. While it is possible to increase the maximum permissible speed by increasing the width of the bright and dark portions of the scale C, this is not practical since limitations are imposed upon by the size of the sensor and optical system used. Also, while the maximum permissible speed can be increased by reducing the period $T_1$, this is again subject to restrictions by the total bit number of the sensor and the maximum driving frequency (i.e., the maximum frequency for driving the sensor), and thus difficulties are involved for obtaining a desired value. With the apparatus according to the invention, light is projected in the form of light pulse for a period $T_L$ within and shorter than the "full emptying scanning" period $T_1$ immediately before the data read-out period. For example, if the period $T_L$ is set to $\frac{1}{3}$ of the period $T_1$ as shown by dashed line in FIG. 10, the maximum permissible speed of the scale C can be increased to three times the speed where light is projected for the period $T_1$. The shorter the pulse width $T_L$ of the illumination light L, the higher is the maximum permissible speed of the scale C. However, in this case the amplitude of the signal $\overline{CO}$ is proportional to the pulse width $T_L$, so that with a constant intensity of the illumination light L the amplitude of the output $\overline{CO}$ is reduced with reducing pulse width $T_L$. In order not to reduce the amplitude of the output $\overline{CO}$, therefore, it is necessary to set the light intensity such that a predetermined amplitude of the output $\overline{CO}$ can be obtained under a condition $T_L < T_{LM}$ where $T_{LM}$ is the width of the light pulse satisfying the maximum permissible speed of a desired scale C. However, the output of the light source is not always constant, and also the light transmission characteristic of the scale C is not constant in any locality. Therefore, it is difficult to always obtain an output $\overline{CO}$ with a predetermined amplitude of the output $\overline{CO}$ for a long time. In order to solve this problem, it may be thought to measure the amplitude of the output $\overline{CO}$ and determine the width of the next light pulse by adding a suitable value $T_I$ to the previous $T_L$ when the measured amplitude is less than a predetermined amplitude and subtracting $T_I$ from the previous $T_L$ when the measured amplitude is greater than the predetermined amplitude. This operation is repeated to determine the final $T_L$. If the finally determined $T_L$ meets the condition $T_L < T_{LM}$, it is possible to hold a predetermined amplitude of the output $\overline{CO}$ under a condition meeting the maximum permissible speed desired for the scale C. By this method, however, it is necessary to read data by scanning several times (usually more than ten times) for determining the final $T_L$. Therefore, high response speed cannot be expected, which is undesired for the measurement in case of the moving scale.

With the apparatus according to the invention, the width $T_L$ of the next light pulse ($T_L°T_{LM}$), for instance, is determined as $$T_{LB} = (E_0/E_A \cdot T_{LA}$$

where $T_{LB}$ is the width of the next light pulse, $T_{LA}$ is the width of the previous light pulse, $E_A$ is the amplitude of the output $\overline{CO}$ obtained with the previous light pulse, and $E_0$ is a predetermined amplitude. With the determination of the next light pulse width $T_{LB}$ by this calculation, the next output $\overline{CO}$ has the predetermined amplitude, and the response speed can thus be increased.

As another example, the pulse width $T_L$ ($T_L < T_{LM}$) may be held constant, and the light intensity, i.e., gain, may be controlled. In this case, the gain $V_B$ for the next light illumination is determined from a calculation based upon $$V_B = (E_0/E_A \cdot V_A$$

where $V_A$ is the gain for the previous light illumination.

It will be seen that the third feature of the invention resides in providing the illumination light as a light pulse. In this case, the light pulse width or intensity of illumination light (gain of light source control) is determined by the aforementioned calculation so that the determined value is within the light pulse width $T_{LM}$ meeting the maximum permissible speed required for the scale C, whereby the amplitude of the output $\overline{CO}$ is always controlled to a predetermined level with high response.

(4) Integration of the processing control sections

For the operation of the whole apparatus, a processing control section, which controls the three means described above and undertakes the processings and control for displaying the obtained data, is necessary.

Meanwhile, the aforementioned three means each require a particular processing control section for achieving their respective purposes.

If these processing control sections are independent of one another, the construction is complicated, and an inexpensive apparatus cannot be expected.

In accordance with the invention, resort is had to the fact that it is not necessary to detect the reference point in an absolute system. More particularly, the individual processing control sections are integrated as a single processing control means where the operations of the individual sections are effected on a time division bases by extending the operation period required for the measurement within a range, within which the functions of the apparatus are not affected, whereby the apparatus can be simplified. FIG. 14 shows waveforms regarding the overall operation of one embodiment of the apparatus according to the invention. In FIGS. 8 and 14, like reference symbols have like meanings. Now, discussion will be made with reference to FIG. 14. Signal $\overline{CO}'$ is obtained as a result of subtracting a value for compensation for the "data in the absence of light", i.e., storage of the dark current, from $\overline{CO}$ (see FIG. 11).

Labeled $t_1$: is a total of N (three in the Figure) "full emptying scanning" periods in the absence of illumination light. The processing control means controls the periods $T_{1-1}$, $T_{1-2}$ and $T_{1-3}$ and supplies proper gate pulses S to the CCD. It also counts the "full emptying scanning" periods and checks whether the scanning is effected a predetermined number of times.

Labeled $t_2$: is a period of reading data in the absence-of-light. The processing control means writes data corresponding to the output $\overline{CO}$ (which is used as a compensation value with respect to the dark current storage at the time of reading data in the presence-of-light) in an absence-of-light data memory section generates a scanning pulse signal and controls the apparatus. During periods $T_3$ and $T_4$. In this period $T_2$, the dark current storage compensation value is cleared, so that $\overline{CO}'$ is the same as $\overline{CO}$.

Labeled $t_3$: is a total of N (three in the Figure) "full emptying scanning" periods in the presence of light. The processing control means makes substantially the same operation as in the period $t_1$, except for that the light source is driven pulse-wise in the last "full emptying scanning". The light pulse width may be an initially set value, or it may be determined by a value obtained in a light pulse width calculation period (see $t_5$)7. (N may be different numbers for the periods $t_1$ and $t_3$.)

Labeled $t_4$: is a data reading period in the presence-of-light. The processing control means reads out data from the absence-of-light data memory and sends forth the data to the subtraction means, thus obtaining a neat output $\overline{CO}'$ resulting from the correction. The processing control means also functions to write data corresponding to the data $\overline{CO}'$ into the result data memory section and to control the periods $T_3$ and $T_4$.

Labeled $t_5$: is a light pulse width calculation period. The processing control means determines the width of the next light pulse for controlling the amplitude of the output $\overline{CO}'$ for the next data read-out scanning period. Also, it checks whether the amplitude of the $\overline{CO}$ in the period $t_4$ has been at a predetermined level, and if the predetermined level is detected, proceeds to the operation in a period $t_6$ while otherwise repeating the operations from the period $t_3$ (operations in the labeled $t_3'$, $t_4'$ and $t_5'$ in the Figure).

Labeled $t_6$: is a period for obtaining and displaying the measurement value. The processing control means reads out data from a result data memory section and effects calculations for deriving the measurement value to display on a display unit.

It will be understood that according to the invention the apparatus is simplified with such an arrangement as to permit serial operation. The operation of the storage effect type sensor is thus naturally liable to be irregular, the effect of this on the measurement can be eliminated by the effect of the "full emptying scanning". In other words, the effect of the "storage effect type sensor drive means" which is one of the features of the apparatus according to the invention is efficiently utilized. The aforementioned object of the invention can be achieved by the various means described above featuring the apparatus according to the invention.

Now, a specific embodiment of the invention will be described.

Figure 11:
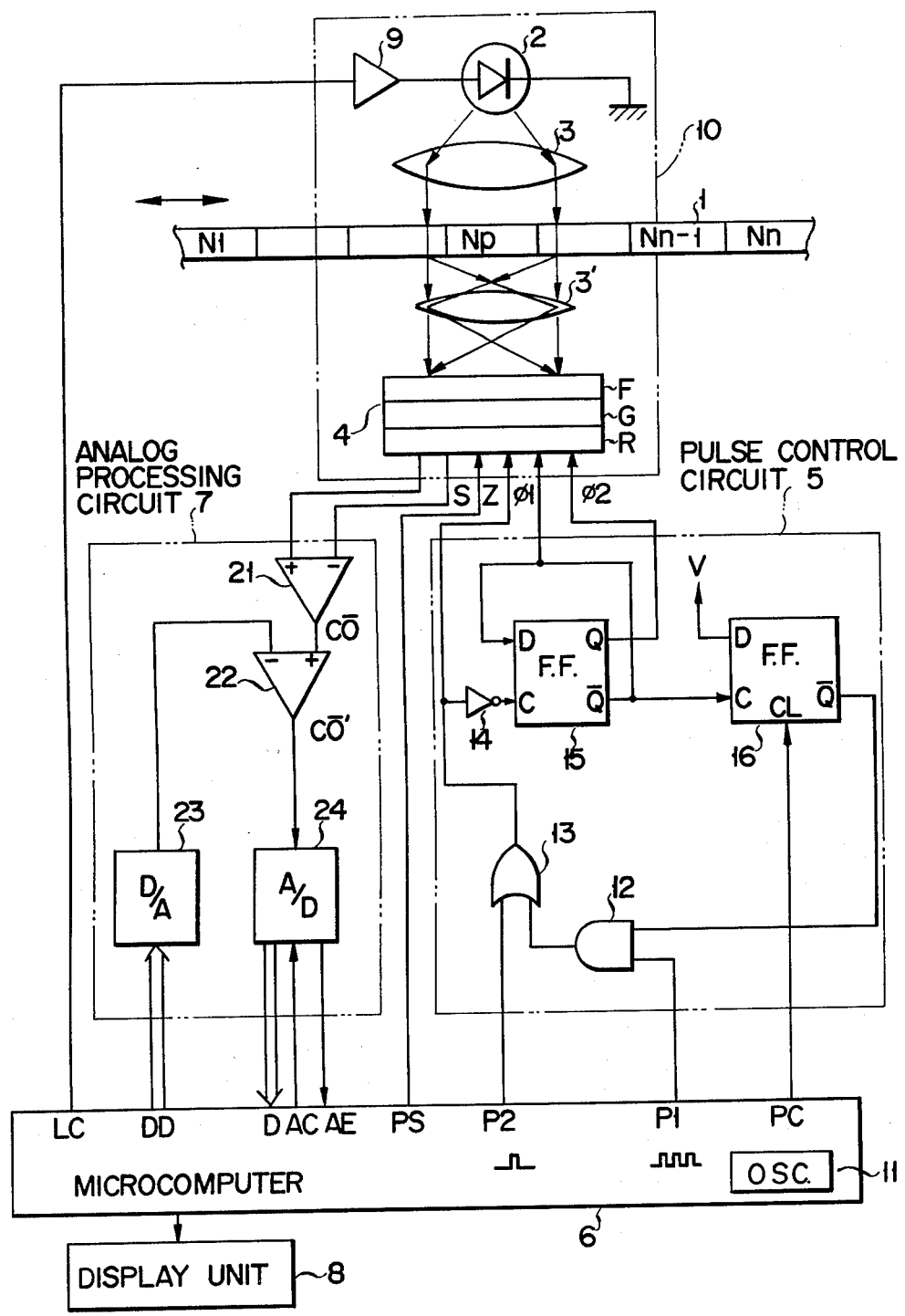
FIG. 11 is a schematic representation of an embodiment of the apparatus according to the invention.
Figure 12A:
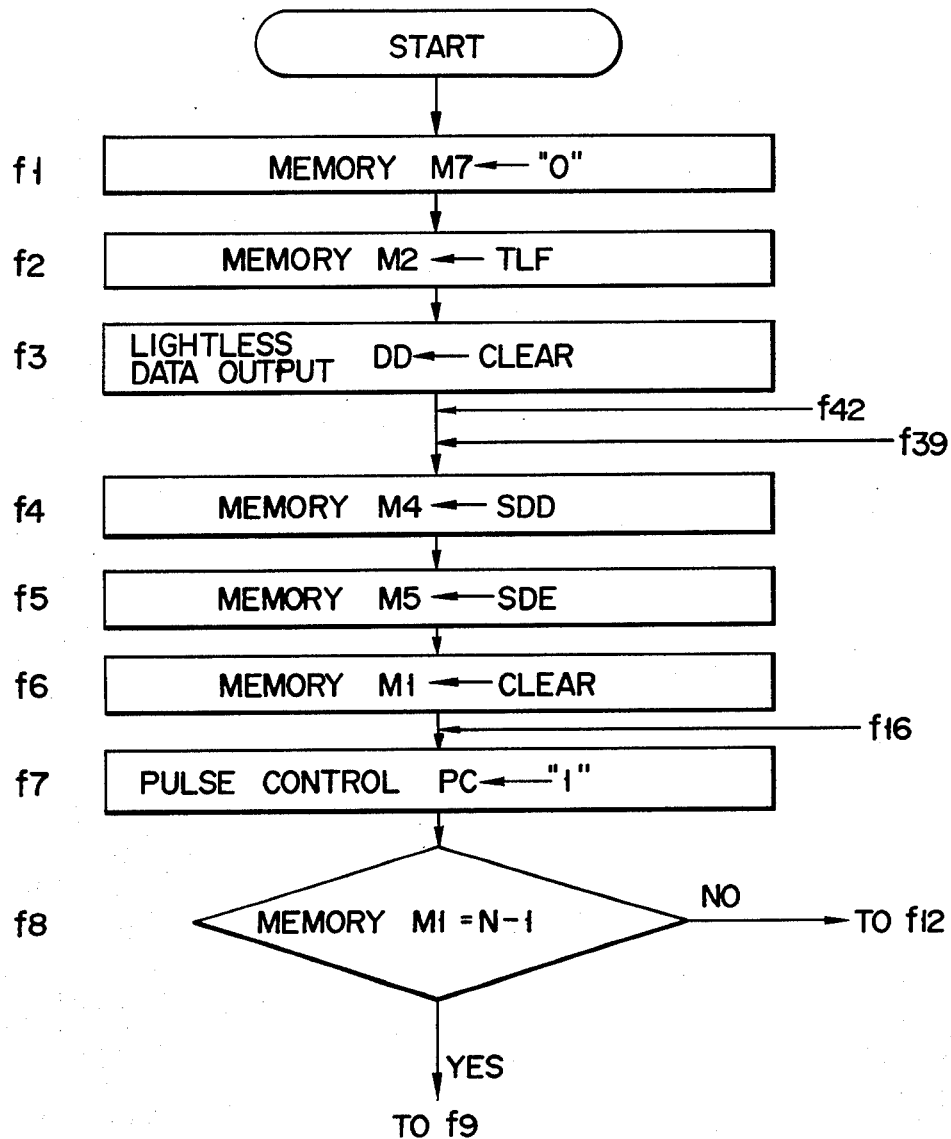
Figure 12B:
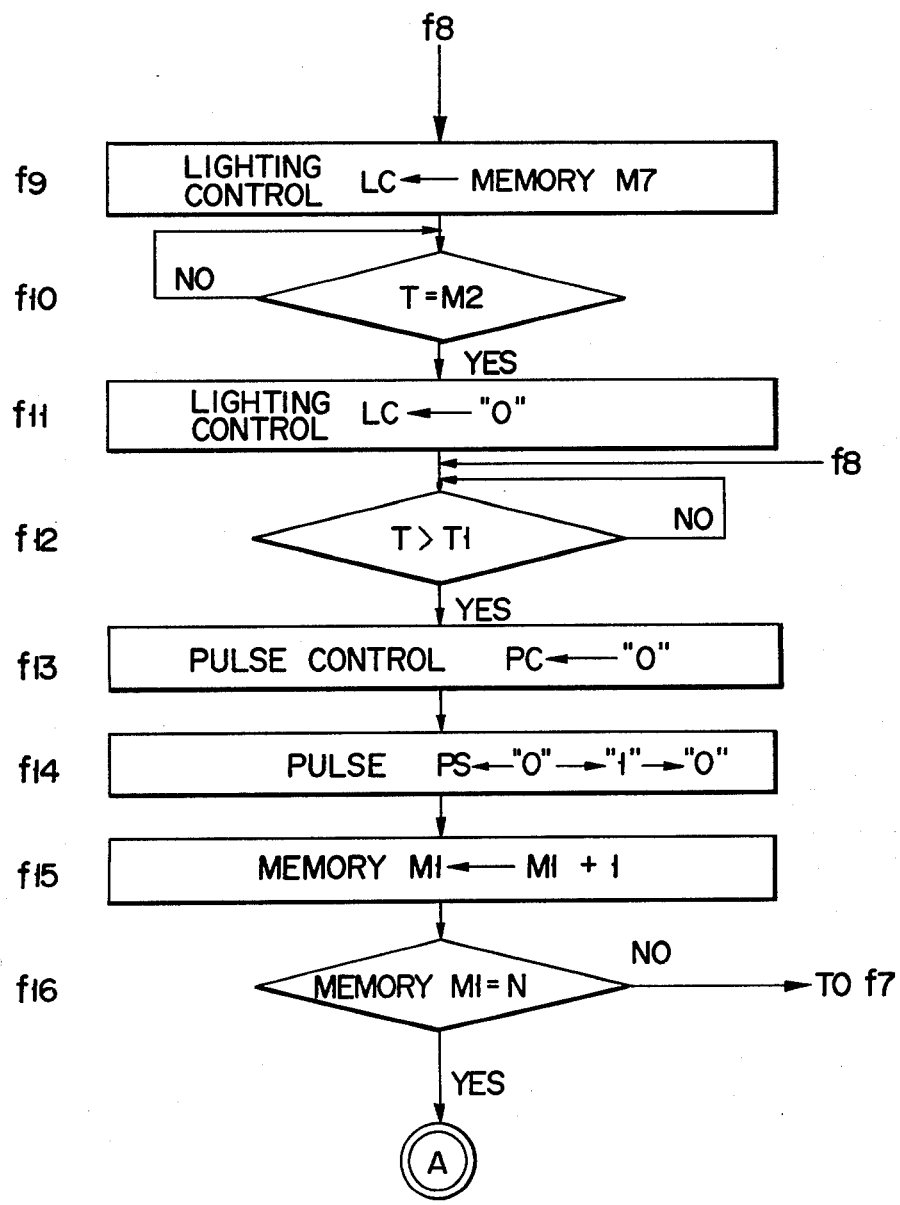
Figure 12C:
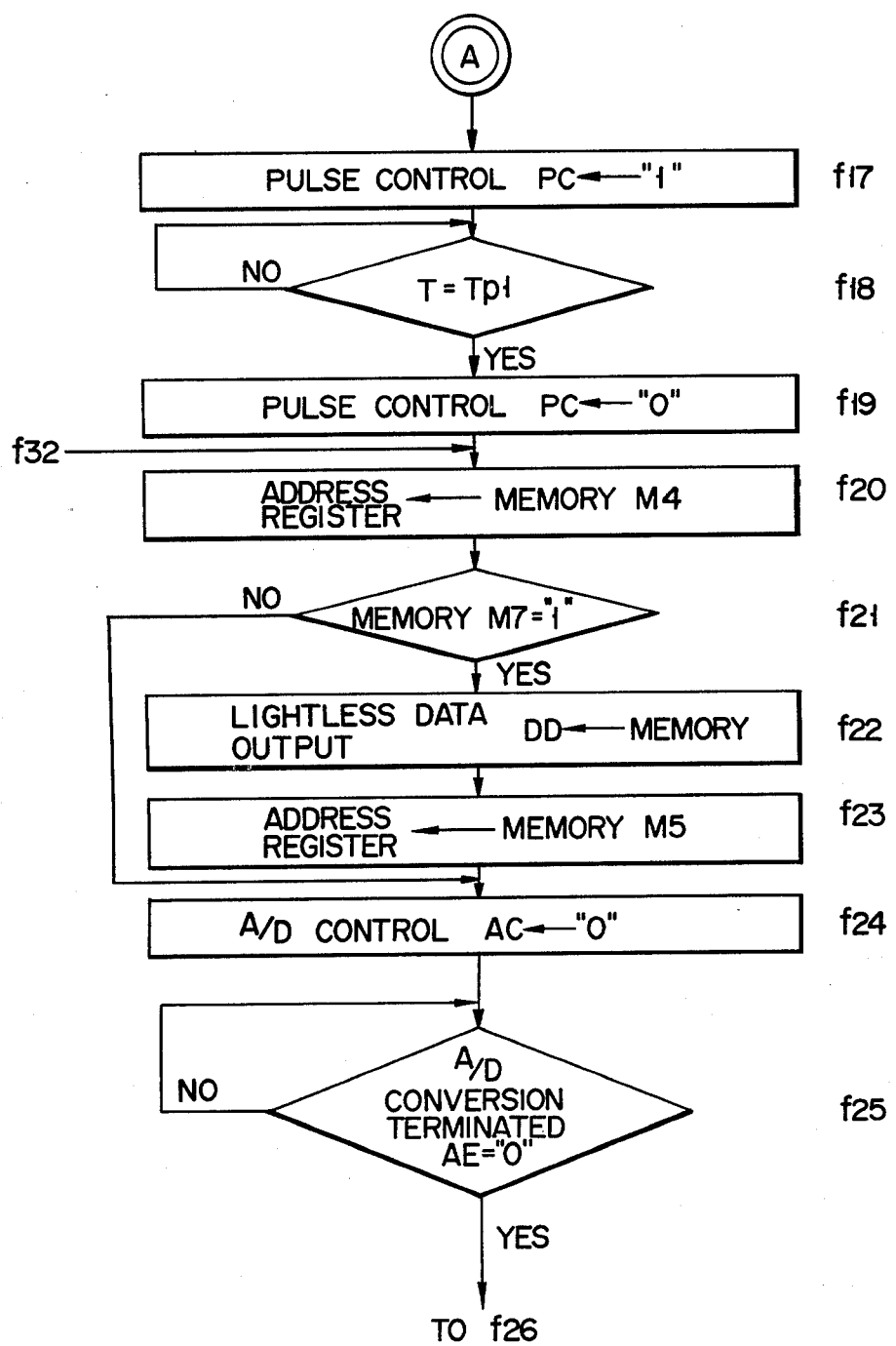
Figure 12D:
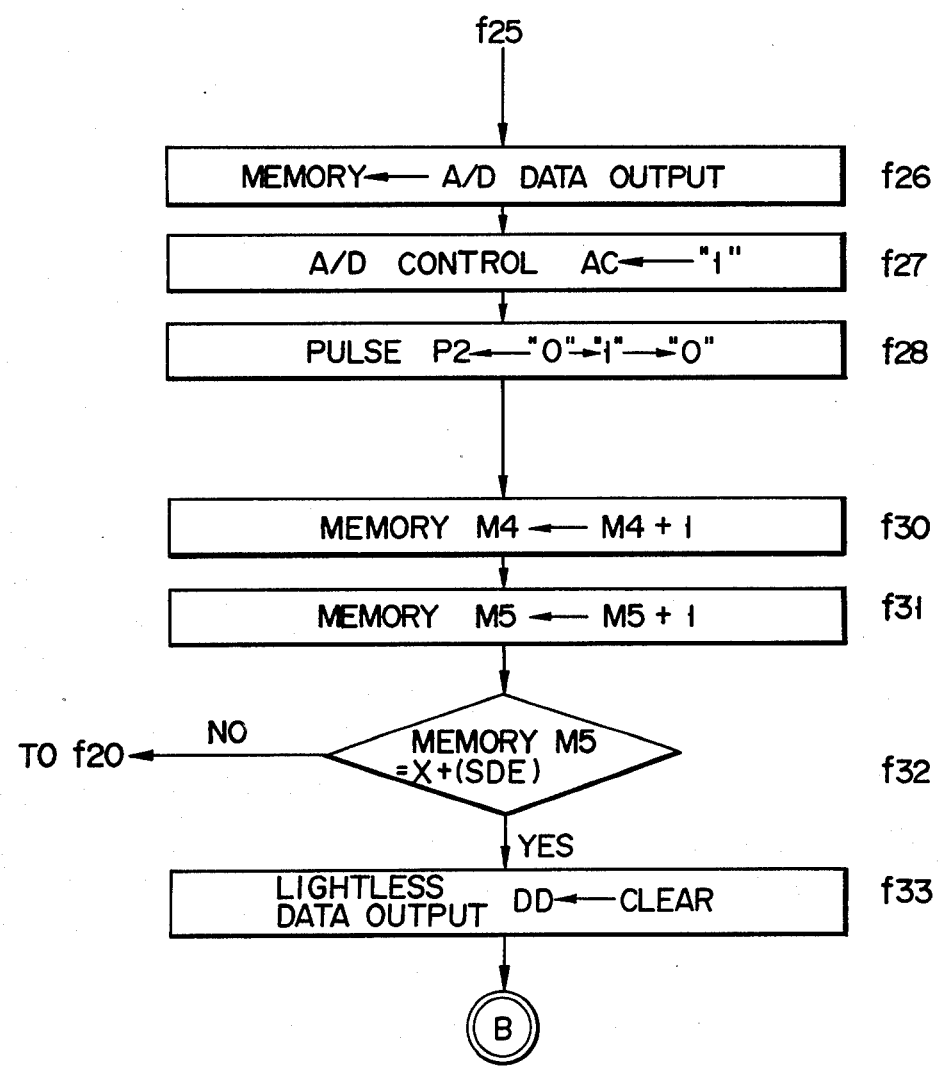
Figure 12E:
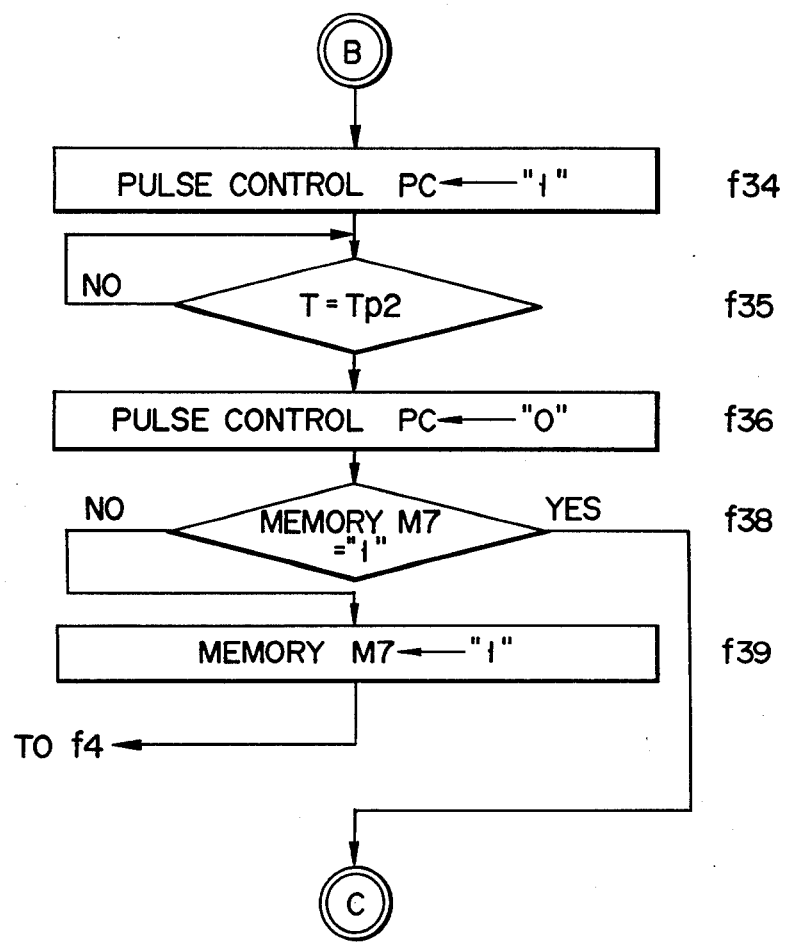

Referring now to FIG. 11, designated at 1 is a linear scale mounted on a movable support. The length of the scale 1 is divided in the longitudinal direction into n blocks like the scale shown in FIG. 3. Each block is provided with a marker and addresses formed in the form of a bright and dark bit pattern like that shown in FIG. 3. A light source 2, which may be a light emitting diode, is provided on one side of the scale 1, and light emitted from the light source 2 is converted by a lens system 3 into a parallel light beam which is projected onto the scale 1. A storage effect type sensor, for instance a CCD 4, is provided on the side of the scale 1 opposite the light source 2 such that light transmitted through the scale 1 is coupled through a lens system 3′ to it. The CCD 4 has a photoelement section F, a gate section G and a shift register section R as mentioned earlier. It is constructed such that when a gate pulse S is given the charge stored in the photoelement section F is transferred to the shift register section R and that when a reset pulse Z and two scanning pulse signals $\phi_1$ and $\phi_2$ at one-half the reset pulse signal frequency and 180° out of phase with each other are given, the content of the shift register section R is sequentially output therefrom. The driving of the CCD 4 is controlled from a microcomputer 6 through a pulse control circuit 5, and the output of the CCD 4 is coupled through an analog processing circuit 7 to the microcomputer 6 and processed therein for display the result of measurement on a display unit 8. A signal LC from the microcomputer 6 is supplied through an amplifier 9 to the light source 2. The light source 2, lens systems 3 and 3′, CCD 4 and amplifier 9 are assembled in a casing 10, which is secured to a stationary support such that the scale 1 extends between the lens systems 3 and 3′ and spaced apart from them.

The pulse control circuit 5 has the following construction. A pulse signal $P_1$ (used for emptying scanning), which is obtained through frequency division of a pulse signal at a sufficiently high frequency from an oscillator 11, which is contained in the microcomputer 6 for operating the hardward thereof, is coupled through an AND gate 12 and an OR gate 13, to the CCD 4 as the reset signal Z thereof and also coupled through an inverter 14 to the clock input terminal C of a flip-flop 15 (which is rendered operative by the rising of the clock signal). The flip-flop 15 is a T flip-flop with its $\overline{Q}$ output coupled to its input terminal D. Its $\overline{Q}$ output is supplied as the scanning pulse signal $\phi_1$, and its Q output as the scanning pulse signal $\phi_2$ of the CCD 4. The $\overline{Q}$ output of the flip-flop 15 is also applied to the clock input terminal C of a flip-flop 16 (which is rendered operative by the rising of the clock signal). When a control pulse PC of logic level "1" is given to the CL terminal of the flip-flop 16, the $\overline{Q}$ output thereof becomes "1", and this $\overline{Q}$ output signal is used to control the AND gate 12 mentioned above. To the OR gate 13, a single pulse $P_2$ (used for the data read-out) is supplied from the microcomputer 6 at a certain timing to be described later.

The analog processing circuit 7 takes out the output of the CCD 4 through its differential amplifier 21. The output $\overline{CO}$ of the differential amplifier 21 is coupled to a positive input terminal of a differential amplifier 22.

The "absence-of-light data" DD which has been stored in the microcomputer 6 is selectively provide as analog signal through a D/A converter 23 to a negative input terminal of the amplifier 22. The output of the differential amplifier 22 is coupled to an A/D converter 24, which is provided to enable the reading even in case when the bit pitch of the scale 1 and the bit pitch, i.e., light receiving element pitch, of the photoelement section F is not an integral multiple relation to each other or when the bits of the scale 1 and those of the photoelement section F are not in aligned positions. When an A/D converter control signal AC from the microcomputer 6 is "1", the A/D converter 24 is in a cleared state, and when the control signal AC is changed to "0" the converter effects the A/D conversion. When the A/D conversion is ended, the logic level of a terminal AE of the microcomputer 6, which has been held at "1" during the A/D conversion operation, is changed to "0".

The apparatus having the above construction according to the invention operates according to a program set in the microcomputer 6. Now, the operation will be described with reference to the flow charts of FIGS. 12A to 12E and 13. Various memories and address registers are provided in the microcomputer 6.

Step $f_1$: In this step, data "0", specifying that no light is to be provided, is written in a light emission control memory $M_7$.

Step $f_2$: this step, the initial value $T_{LF}$ of the illumination light pulse width is written in a memory $M_2$. While the initial value $T_{LF}$ may be generally an adequate value, in the instant embodiment it is set to a value close to a value corresponding to a predetermined amplitude of the output $\overline{CO}$ for reducing the time required until the reaching of this amplitude.

Step $f_3$: In this step, the "absence-of-light data" DD is cleared. In consequence, the output of the D/A converter 23 is reduced to, for instance 0 V.

Step $f_4$: In this step, the first address SDD of the memory, in which the "absence-of-light data" is written, is written in a memory $M_4$.

Step $f_5$: In this step, the first address SDE of the memory, in which the result data is written, is written in a memory $M_5$.

Step $f_6$: In this step, the content of a memory $M_1$, which is used as a counter and has separate addresses from the data area memories, is cleared.

Step $f_7$: In this step, the pulse control signal PC is set to "1". In consequence, the pulse signal $P_1$ is provided through the AND gate 12 to start the "emptying scanning". Steps $f_7$ through $f_{13}$ constitute the operation of "full emptying scanning".

Step $f_8$: While the "full emptying scanning" is effected the required number N of times through the steps $f_7$ to $f_{13}$, in this step whether the "full emptying scanning" is the last one is determined from the content of the memory $M_1$. If this is so (YES), the operation proceeds to the step $f_9$, while otherwise (NO) to the step $f_{12}$.

Step $f_9$: In this step, the content of the memory $M_7$ is set in the light emission control LC. In consequence, the light source 2 is turned on when the content of the memory $M_7$ (which is "0" at the time of reading of the "absence-of-light data") becomes "1".

Step $f_{10}$: In this step, the time from the instant when "1" is set in the light emission control LC is measured, and when the time written in the memory $M_2$ is elapsed, the operation proceeds to the step $f_{11}$.

Step $f_{11}$: The light emission control LC is set to "0" to turn off the light source 2.

Step $f_{12}$: In this step, the time from the start of the "full emptying scanning" is measured (by monitoring the time by making use of the period of the program operation of the microcomputer 6) until the time from the start of the "full emptying scanning" reaches a value corresponding to the number of all bits in the shift register section divided by 2 times the frequency of $\phi_1$.

Step $f_{13}$: In this step, the pulse control signal PC is set to "0", thus bringing an end to the "full emptying scanning". This state is brought about when $Z="0"$, $\phi_1="1"$ and $\phi_2="0"$ are set after the signal PC is set to "0" by the pulse control circuit 5. In this state, the transfer of the charge from the photoelement section F to the shift register section R of the CCD 4 can be caused by setting the signal S to the CCD 4 to "1".

Step $f_{14}$: In this step, a single pulse is provided ("0" to "1" to "0") from a terminal PS, thus causing the transfer of charge from the photoelement section F to the shift register section R of the CCD 4.

Step $f_{15}$: In this step, (1) is added to the content of the memory $M_1$.

Step $f_{16}$: In this step, the content of the memory $M_1$ is compared with N (i.e., number of times of "full emptying scanning" required). If the content of the memory $M_1$ is not reached to N, the operation proceeds to the step $f_7$.

Step $f_{17}$: In this step, the pulse control signal PC is set to "1". In consequence, the "emptying scanning" is started gain. More particularly, the "partial emptying scanning" is effected in steps $f_{17}$ through $f_{19}$. ($T_4$ in FIG. 7 corresponds to the steps $f_{14}$ to $f_{17}$.)

Step $f_{18}$: In this step, the time being elapsed is monitored until the time $T_{P1}$ required for the (leading) "partial emptying scanning" is reached.

Step $f_{19}$: In this step, the pulse control PC is set to "0", thus bringing an end to the (leading) "partial emptying scanning".

Step $f_{20}$: In this step, the content of the memory $M_4$ is written in the address register.

Step $f_{21}$: In this step, whether the content of the memory $M_7$ is "1" is checked. If this is so (YES), the operation proceeds to a step $f_{22}$, and otherwise (NO) to a step $f_{24}$. The content "1" of the memory $M_7$ indicates the "presence-of-light", and the content "0" indicates the "absence-of-light".

Step $f_{22}$: In this step, the content of the memory specified by the address register is set in the "absence-of-light data" output DD. In consequence, one of the "absence-of-light data" already obtained is corresponded to the bit of the CCD 4, and is provided from the output DD.

Step $f_{23}$: In this step, the content of the memory $M_5$ is written in the address register.

Step $f_{24}$: In this step, the A/D control AC is set to "0". In consequence, the A/D converter 24 is caused to start the operation of the A/D conversion.

Step $f_{25}$: In this step, the process is waited until the A/D conversion end output AE becomes to "0".

Step $f_{26}$: In this step, the A/D converter output data is written in the memory specified by the address register.

Step $f_{27}$: In this step, the A/D converter control AC is set to "1". In consequence, the A/D converter 24 is cleared.

Step $f_{28}$: In this step, a single pulse $P_2$ ("0" to "1" to "0") is provided. In consequence, a bit shift for one bit is caused in the shift register section R of the CCD 4.

In the steps $f_{24}$ through $f_{28}$, the output of the differential amplifier 22 is subjected to analog-to-digital conversion in the A/D converter 24 and written in the memory specified by the address register, while a shift for one bit is caused in the shift register section R by the pulse $P_2$. In the operation in the "absence-of-light" (LC="0"), the absence-of-light data output DD is held cleared in the steps $f_{20}$ through $f_{28}$ since the steps $f_{22}$ and $f_{23}$ are not executed. Also, since LC="0" in the step $f_9$, no light is provided from the light source 2 at the time of the last "full emptying scanning". Thus, 0 V and the output $\overline{CO}$ of the differential amplifier 21 at the time of the "absence-of-light" are provided to the respective negative and positive input terminals of the differential amplifier 22. Consequently, the output $\overline{CO}$ of the differential amplifier 22 in this case is the same as the output of the differential amplifier 21. While the analog output $\overline{CO}'$ of the differential amplifier 22 is digitally converted and written in a memory through the steps $f_{24}$ through $f_{28}$, the content of the address register indicating the memory at this time (the content of the memory $M_4$) is the address of "absence-of-light" data memory. Thus, the data is written in the "absence-of-light" data memory area. In the case of the operation in the "presence-of-light" (LC="1") in the steps $f_{20}$ through $f_{28}$, the content of the memory specified by the address register (i.e., the content of the memory $M_4$ or "absence-of-light" data memory) is set in the "absence-of-light data" output DD in the step $f_{22}$. Then, the content of the address register is replaced with the content of the memory $M_5$ in the step $f_{23}$. In this case, the light source 2 provides light at the time of the last "full emptying scanning" since LC="1" in the step $f_9$. Thus, the signal obtained through the digital-to-analog conversion of the "absence-of-light" data (which is the same as the output $\overline{CO}$ of the differential amplifier 21) and the output $\overline{CO}$ of the differential amplifier 21 at the time of the "presence-of-light" are coupled to the respective negative and positive input terminals of the differential amplifier 22. Thus, the output $\overline{CO}'$ of the differential amplifier 22 is the output of the differential amplifier 21 at the time of the "presence-of-light" minus the output at the time of the "absence-of-light". While the output $\overline{CO}'$ of the differential amplifier 22 (i.e., result of subtraction) is digitally converted and written in the memory in the steps $f_{24}$ through $f_{28}$, the content of the address register specifying the memory at this time (the content of the memory $M_5$) is the address of the result data memory. Thus, the data is written in the result data memory.

Step $f_{30}$: In this step, (1) is added to the content of the memory $M_4$.

Step $f_{31}$: In this step, (1) is added to the content of the memory $M_5$.

Step $f_{32}$: In this step, whether the content of the memory $M_5$ is X+(SDE), that is, whether the necessary data is completely obtained, is checked. Where X represents numbers of necessary data.) Since the content of the memory $M_4$ is changed in correspondence to the content of the memory $M_5$, the checking regarding X+(SDE) can also be regarded as the checking regarding X+(SDD). The steps $f_{20}$ through $f_{32}$ are repeated for the data read-out scanning.

Step $f_{33}$: In this step, the "absence-of-light" data output DD is cleared.

Step $f_{34}$: In this step, like the step $f_{17}$, the (trailing) "partial emptying scanning" is started.

Step $f_{35}$: In this step, the elapsed time is monitored until a predetermined time $T_{P2}$ necessary for the (trailing) "partial emptying scanning" is elapsed.

Step $f_{36}$: In this step, the pulse control PC is set to "0", thus bringing an end to the (trailing) "partial emptying scanning". Here, the same operation as in the step $f_{14}$ (for causing the generation of a single pulse from the terminal PS) is executed.

Step $f_{38}$: In this step, whether the content of the memory $M_7$ is "1" is checked. If this is so (YES), the operation proceeds to a step $f_{40}$, while otherwise (NO) "1" is written in the memory $M_7$ in a step $f_{39}$ then returning to the step $f_4$ for the operation in the "presence-of-light".

Step $f_{40}$: In this step, the amplitude of the signal that is written as the result data in the data memory ($M_{SDE}$ to $M_{SDE+X-1}$) in the steps $f_{24}$ to $f_{28}$ is derived and written in the memory $M_3$. The amplitude of the signal is derived by obtaining the difference between the maximum and minimum values of the data.

Step $f_{41}$: In this step, the result is produced by the following equation and is written into the memory $M_2$ $$\frac{\text{Predetermined amplitude } E_0}{\text{Content of the memory } M_3} \times \frac{\text{Content of the memory}}{M_2 \text{ (Previous light pulse width)}}$$
(Amplitude value)

Thus, at this instant the content of the memory $M_2$ (light pulse width) is changed to a new value.

Step $f_{42}$: In this step, whether the content of the memory $M_3$ (amplitude value) is between the upper limit ($E_{0-2}$) and lower limit ($E_{0-1}$) of the predetermined level range is checked. $E_{0-2}$ and $E_{0-1}$ are preliminarily given as permissible amplitude variation values. If this is so (YES), the operation goes to a step $f_{43}$, while otherwise (NO) the operation is returned to the step $f_4$ for repeating the steps $f_4$ through $f_{42}$ (in the "presence-of-light" state).

Step $f_{43}$: In this step, contents of the memory are successively scanned for comparison of their levels with a threshold level from the memory corresponding to the index bit $I_n$ (see FIG. 3) of the CCD 4, and the first one of three or more successive white (greater level) bits immediately after five or more successive black (less level) bits is determined to be the marker bit $I_m$ (see FIG. 3), and the bits up to this bit are counted. In the case of FIG. 3, the count of the bits is 5. This value is written in the memory $M_8$.

Step $f_{44}$: In this step, whether the bit corresponding to a given count from the marker bit $I_m$, i.e., the bit corresponding to the address section, is white or not is checked, and the block number of the scale 1 is derived and written in the memory $M_9$.

Step $f_{45}$: In this step, the distance E from the reference point is calculated using an equation $$E = m(N_s M_9 - M_8)$$

where $N_s$ is the bit number of one block given as the element number in the photoelement section of the CCD 4 and m is the element pitch, and the result is written in a display memory. Where, $M_9$ and $M_8$ are respectively the contents of the memories $M_9$ and $M_8$.

By the above operation, E is displayed on the display unit 8.

While a preferred embodiment has been described in the foregoing, it is given for the sake of illustration only, and various changes and modifications are possible without departing from the scope and spirit of the invention. For example, while in the above embodiment the width of the constant intensity light pulse has been controlled, it is also possible to control the gain regarding the light of illumination, i.e., the illumination light intensity, as previously mentioned. Also, the scale 1 shown in FIG. 3 is only an example and by no means limitative. For example, the block address information may be encoded into binary coded decimal codes or gray codes. Also, redundancy (such as parity bits) may be provided at the time of the encoding so as to permit detection and correction of errors at the time of the reading of the block address information. Further, it is possible to make use of intermediate light levels in addition to the "bright" and "dark" levels in order to increase the recording density through multi-threshold-level encoding such as tertiary or quaternary encodings.

Further, while in the above embodiment the light source and CCD are held stationary and the scale is movably supported, it is also possible to hold the scale stationary and movably support the light source and CCD. Also, it is possible to project not only the transmitted image but also the reflected image of the scale pattern onto the CCD. Further, while in the above embodiment the pulse $P_1$ has been obtained through frequency division of the output of an oscillator provided within the microcomputer by a frequency divider which is also provided within the microcomputer, it is also possible to provide an external frequency divider. Also, it is possible to employ a separate oscillator. Further, it is possible to provide a pulse generator, which generates one pulse every time the signal, for instance, at the A/D conversion end signal terminal AE of the A/D converter 24 becomes "0", and use the pulse output of this pulse generator as the pulse $P_2$. Further, the "partial emptying scanning" can of course be omitted when all the bits of the CCD 4 are used as measurement bits. Further, while the above embodiment is adapted for the measurement of the length, the invention may of course be applied to the measurement of the angle as well.

As has been described in detail in the foregoing, with the apparatus according to the invention, use is made of a storage effect type sensor, typically a CCD, and the reading of data from the sensor is made after making the "emptying scanning" at a drive frequency higher than the drive frequency at the time of the reading, so that it is possible to suppress the reference level fluctuations introduced into the data due to the storage of dark current as mentioned above to a small value, thus preventing the errors due to the aforementioned fluctuations from being introduced into the measurement. Further, since a lower drive frequency than the drive frequency for the "emptying scanning" has been used for the reading of data, the data processing and control can be effected with a comparatively low-speed system in addition to the capacity of suppressing the reference level fluctuations to be within a small value. Further, since with the apparatus according to the invention the data obtained by subtracting the "absence-of-light data" from the "presence-of-light data" has been processed, it is possible to eliminate the aforementioned reference level fluctuations and individual bit output fluctuations with temperature changes, thus permitting steady and reliable operation of the signal processing system and improvement of the precision of measurement. Further, since with the apparatus according to the invention the illumination light is provided in the form of a light pulse and the light pulse width or gain of light emission is controlled such as to maintain the storage effect type sensor output amplitude at a predetermined level, it is possible to obtain measurement without any trouble even where the relative speed of the scale and storage effect type sensor is high and also permit compensation for variations of the light intensity of the light source and variations of the transmission characteristics. Thus, steady and stable operation of the data processing system can be obtained, and also extension of the scope of utility and improvement of the reliability can be obtained.

By making full use of the features of the absolute system for the serial operation of the processing control system, which has the above effects, the apparatus as a whole can be simplified, and its cost can be reduced.

What is claimed is:

1. A pattern reading apparatus comprising:
   illuminating means for forming light beams in a predetermined pattern;
   a storage effect type sensor including a photoelectric section illuminated by said predetermined pattern of light beams, said photoelectric section having a plurality of photoelectric elements for receiving said light beams from said illuminating means, converting the same to electric charges and storing the electric charges, and a register section for simultaneously storing the electric charges transferred from the photoelectric elements;
   sensor drive means for controlling the transfer of the electric charges from said photoelectric section to said register section and scanning said register section to read out data therefrom and to empty said register section of contents, said scanning to empty said register section occurring at a frequency higner than the frequency of scanning to read out data from said register section and prior to the transfer control, and
   illumination control means for controlling an illumination light quantity of said illuminating means during the scanning to empty said register section.

2. A pattern reading apparatus according to claim 1, wherein said illuminating means includes an object which has a predetermined pattern and a light source for illuminating said object.

3. A pattern reading apparatus according to claim 1, which furtner comprises means for substracting read out data corresponding to when said photoelectric section does not receive said light beams from read out data corresponding to when said photoelectric section receives said light beams.

4. A pattern reading apparatus according to claim 1, wherein said illuminating means emits light pulses, and said illumination control means controls the width $T_{LB}$ of any lignt pulse to $$T_{LB} = (E_O/E_A)T_{LA}$$

where $T_{LA}$ is the width of the preceding light pulse, $E_O$ is a reference amplitude, and $E_A$ is an amplitude of the output obtained from the preceding light pulse.

5. A pattern reading apparatus according to claim 2, wherein said illuminating means emits light pulses, and said illumination control means controls the width $T_{LB}$ of any light pulse to $$T_{LB} = (E_O/E_A)T_{LA}$$

where $T_{LA}$ is the width of the preceding light pulse, $E_O$ is a reference amplitude, and $E_A$ is an amplitude of the output obtained from the preceding light pulse.

6. A pattern reading apparatus according to claim 3, wherein said illuminating means emits light pulses, and said illumination control means controls the width $T_{LB}$ of any light pulse to $$T_{LB} = (E_O/E_A)T_{LA}$$

where $T_{LA}$ is the width of the preceding light pulse, $E_O$ is a reference amplitude, and $E_A$ is an amplitude of the output obtained from the preceding light pulse.

7. A pattern reading apparatus according to claim 1, wherein said illuminating means emits light pulses, and said illumination control means controls the gain $V_B$ of any light pulse to $$V_B = (E_O/E_A)V_A$$

where $V_A$ is the gain of the preceding light pulse, $E_O$ is a reference amplitude, and $E_A$ is an amplitude of the obtained from the preceding light pulse.

8. A pattern reading apparatus according to claim 2, wherein said illuminating means emits light pulses, and said illumination control means controls the gain $V_B$ of any light pulse to $$V_B = (E_O/E_A)V_A$$

where $V_A$ is the gain of the preceding light pulse, $E_O$ is a reference amplitude, and $E_A$ is an amplitude of the output obtained from the preceding light pulse.

9. A pattern reading apparatus according to claim 3, wherein said illuminating means emits light pulses, and said illumination control means controls the gain $V_B$ of any light pulse to $$V_B = (E_O/E_A)V_A$$

where $V_A$ is the gain of the preceding light pulse, $E_O$ is a reference amplitude, and $E_A$ is an amplitude of the output obtained from the preceding light pulse.

10. A pattern reading apparatus comprising:
    illuminating means forming light beams in a predetermined pattern;
    a storage effect type sensor including a photoelectric section illuminated by said predetermined pattern of light beams, said photoelectric section having a plurality of photoelectric elements for receiving light beams from said illuminating means converting the same to electric charges and storing the electric charges, and a register section for simultaneously storing the electric charges transferred from the photoelectric elements;
    sensor drive means for controlling the transfer of the electric charges from said photoelectric section to said register section and scanning said register section to read out data from said register section and to empty the register section, said scanning to empty said register section occurring at a frequency higher than the frequency of scanning to read out data from the register section and prior to the transfer control; and
    means for processing read out data corresponding to when said photoelectric section receives said light beams and read out data corresponding to when said photoelectric section does not receive light beams so that fluctuation components of the former can be substantially reduced.

11. A pattern reading apparatus according to claim 10, wherein said illuminating means includes an object which has a predetermined pattern and a light source for illuminating said object.

12. A pattern reading apparatus according to claim 10, which further comprises means for substracting the read out data corresponding to when said photoelectric section does not receive said light beams from the read out data corresponding to when said photoelectric section receive said light beams.

13. A pattern reading apparatus according to claim 10, wherein said illuminating means emits light pulses, and said illumination control means controls the width $T_{LB}$ of any lignt pulse to $$T_{LB}=(E_O/E_A)T_{LA}$$

where $T_{LA}$ is the width of the preceding light pulse, $E_O$ is a reference amplitude, and $E_A$ is an amplitude of the output obtained from the preceding light pulse.

14. A pattern reading apparatus according to claim 12, wherein said illuminating means emits light pulses, and said illumination control means controls the width $T_{LB}$ of any light pulse to $$T_{LB}=(E_O/E_A)T_{LA}$$

where $T_{LA}$ is the width of the preceding light pulse, $E_O$ is a reference amplitude, and $E_A$ is an amplitude of the output obtained from the preceding light pulse.

15. A pattern reading apparatus according to claim 12, wherein said illuminating means emits light pulses, and said illumination control means controls the widtn $T_{LB}$ of any lignt pulse to $$T_{LB}=(E_O/E_A)T_{LA}$$

where $T_{LA}$ is the width of the preceding light pulse, $E_O$ is a reference amplitude, and $E_A$ is an amplitude of the output obtained from the preceding light pulse.

16. A pattern reading appararus according to claim 10, wherein said illuminating means emits light pulses, and said illumination control means controls the gain $V_B$ of any light pulse to $$V_B=(E_O/E_A)V_A$$

where $V_A$ is the gain of the preceding light pulse, $E_O$ is a reference amplitude, and $E_A$ is an amplitude of the output obtained from the preceding light pulse.

17. A pattern reading apparatus according to claim 11 wherein said illuminating means emits light pulses, and said illumination control means controls the gain $V_B$ of any light pulse to $$V_B=(E_O/E_A)V_A$$

where $V_A$ is the gain of the preceding light pulse, $E_O$ is a reference amplitude, and $E_A$ is an amplitude of the output obtained from the preceding light pulse.

18. A pattern reading apparatus according to claim 12 wherein said illuminating means emits light pulses, and said illumination control means controls the gain $V_B$ of any light pulse to $$V_B=(E_O/E_A)V_A$$

where $V_A$ is the gain of the preciding light pulse, $E_O$ is a reference amplitude, and $E_A$ is an amplitude of the output obtained from the preceding light pulse.

* * * * *